United States Patent
Zitelli

(10) Patent No.: US 7,349,636 B2
(45) Date of Patent: Mar. 25, 2008

(54) OPTICAL PHASE AND INTENSITY MODULATION WITH IMPROVED TRANSMITTERS

(75) Inventor: Mario Zitelli, Via Enrico Fermi, 130, Rome (IT) 00146

(73) Assignee: Mario Zitelli, Rome (IT)

( * ) Notice: Subject to any disclaimer, the term of this patent is extended or adjusted under 35 U.S.C. 154(b) by 705 days.

(21) Appl. No.: 10/732,404

(22) Filed: Dec. 11, 2003

(65) Prior Publication Data

US 2005/0002676 A1  Jan. 6, 2005

(51) Int. Cl.
*H04B 10/04* (2006.01)
*H04B 10/12* (2006.01)

(52) U.S. Cl. .................. 398/185; 398/140; 398/183; 359/276; 359/279

(58) Field of Classification Search ............... 398/183, 398/185, 140; 359/276, 279
See application file for complete search history.

(56) References Cited

U.S. PATENT DOCUMENTS 5,420,868 A * 5/1995 Chraplyvy et al. ......... 398/185
6,028,695 A * 2/2000 Uemura et al. ............. 359/279
6,122,086 A * 9/2000 Djupsjobacka .............. 398/185
6,813,448 B1* 11/2004 Chiappetta .................. 398/158
2003/0007216 A1* 1/2003 Chraplyvy et al. ......... 359/161
2006/0221437 A1* 10/2006 Smith et al. ............... 359/337.4

OTHER PUBLICATIONS

Novel CS-RZ signal format with tunable pulse width and better tolerance to nonlinear degradation; Li et al.; Lasers and Electro-Optics Society, 2003, LEOS 2003. The 16th Annual Meeting of the IEEE; vol. 2, pp. 763-764.*

* cited by examiner

*Primary Examiner*—Jason Chan
*Assistant Examiner*—Nathan Curs

(57) ABSTRACT

An apparatus for transmitting at least a digital optical signal with a simultaneous modulation of the amplitude and the phase, the said encoded optical signal having improved spectral efficiency and performances, and being generated by transmitters with simplified scheme; an optical communication system comprising the said apparatus, a transmission line and an apparatus to receive the said optical signal.

25 Claims, 5 Drawing Sheets a)

b)

c)

Time (ps)       Time (ps)

OPTICAL PHASE AND INTENSITY MODULATION WITH IMPROVED TRANSMITTERS

CROSS-REFERENCE TO RELATED APPLICATIONS

The invention is an improvement to the patent application Ser. No. 10/345,244, now abandoned with Publication No. US 2003/0147646 A1, filed by the inventor on Jan. 16, 2003.

FIELD OF THE INVENTION

The invention relates to the transmission of optical signals in optical fiber communication systems, with improved capacity [bit/s] and spectral efficiency [bit/s/Hz], with a simplified scheme for the optical transmitter and reduced bandwidth for the used electronic and opto-electronic devices.

BACKGROUND OF THE INVENTION

In the last years, several efforts have been made for proposing new optical communication modulation formats. The common goal for those new formats is to overcome the limitations imposed by the traditional modulation technique (i.e. the Intensity Modulated with Direct Detection systems, IM-DD) in terms of bandwidth requirements for both the optical and electrical components.

The Wavelength Division Multiplexing (WDM) technique, where several digital optical signals at different wavelengths are transmitted together in the same optical fiber, is now commonly used to increase the overall transport capacity [bit/s]; this makes of the spectral efficiency [bit/s/Hz], defined as the ratio between the bit rate R [bit/s] for each WDM channel and the frequency spacing among these, a parameter of great importance in the design of optical transport networks. IM-DD systems have typical spectral efficiencies of 0.4 bit/s/Hz, and using complex techniques like the Polarization Interleaving (PI), Polarization Domain Multiplexing (PDM) and Vestigial Side Band (VSB) it is hardly possible to reach the value of 0.8 bit/s/Hz.

Next generation WDM channels are planned to transmit at bit rates of R=40, 80 and 160 Gbit/s; the feasibility of commercial IM-DD transmitters at those bit rates is not obvious, because the required bandwidth for the electronics and opto-electronics is comparable to R. The development of stable 40 GHz electronics has emerged in the last few years, and is still characterized by high production costs, while the development of electronics with cut-off frequency approaching to 80 or 160 GHz is still far to come.

Modulation formats alternative to standard IM-DD may help to increase the system spectral efficiency, to reduce the bandwidth requirements both in the optical and electrical domain, and/or to improve the transmission performances and tolerances to the linear (Group Velocity Dispersion, Polarization Dispersion) and nonlinear (Kerr and Raman effects) optical impairments. Recently, optical systems using polibinary optical signals or with multilevel amplitude have been proposed [S. Walklin et al. "Multilevel signaling for increasing the reach of 10 Gb/s lightwave systems", IEEE Journal of Lightwave Technology 17, pp. 2235-2247 (November 1999)]. Multilevel optical phase has been described in [R. A. Griffin et al., "10 Gb/s optical differential quadrature phase shift key (DQPSK) transmission using GaAs/AlGaAs integration", proc. of OFC 2002, FD6-1]. The use of optical phase modulation with pulsed optical carrier (Return-to-Zero Differential Phase Shift Keying, RZ-DPSK) has been introduced in [T. Miyano et al., "Suppression of degradation induced by SPM/XPM+GVD in WDM transmission using bit-synchronous intensity modulated DPSK", proc. of OECC'00, vol. 14D3 (2000)]. The combined use of Non-Return-to-Zero (NRZ) intensity modulation and phase modulation has been proposed by [M. Ohm et al. "Quaternary optical ASK-DPSK and receivers with direct detection", IEEE Photonics Technology Letters 15, pp. 159-161 (January 2003)], although this method requires the use of a reduced extinction ratio for the intensity. The combined use of dark pulse intensity modulation and phase modulation has been proposed in February 2002 and January 2003 by the inventor [Patent Application Publication no. US2003/0147646 A1, IT-RM2002A000056]; the proposed format has the advantage that both the optical intensity and phase have maximum extinction ratio and performances.

The optical formats proposed above require reduced bandwidth for the electronics and the opto-electronics. Conversely, the use of multilevel amplitude or phase, as well as the use of intensity modulation with reduced extinction ratio, has the disadvantage to lower the received eye opening, causing the reduction of the system performances. Besides this, all the proposed formats require complex transmitter schemes, with heavy electronics or with at least one optical modulator for each tributary multiplexed into a WDM channel.

BRIEF SUMMARY OF THE INVENTION

The invention relates to an optical communication system in which at least one digital optical signal is transmitted with a simultaneous modulation of the amplitude and the phase.

The basic idea in one aspect of the present invention is to simultaneously modulate an optical field with a first encoded sequence of optical dark pulses, representative of a first tributary, and a second encoded sequence of optical phase, representing a second tributary. A "dark pulse" is a temporal region of reduced optical power produced on a substantially continuous flow of optical radiation, over a certain portion $\Delta t_1$ (FIG. 3, 340) of the bit period $T_B$; the said encoded sequence of dark pulses 328 is characterized by having nearly unperturbed intensity on a portion $T_B-\Delta t_1$ 342 of the bit period $T_B$, independently on the transmitted bit; the said encoded phase modulation 330 advantageously uses the said portion $T_B-\Delta t_1$ of the bit period $T_B$ to add a phase code representative of a second independent tributary. The said aspect of the present invention is an improvement to the Phase and Intensity Modulation format (PhIM), previously described by the inventor in Patent Application Publication no. US2003/0147646 A1, with an improved scheme for the optical transmitter, that requires the use of only one dual drive optical modulator instead of two distinct intensity and phase modulators.

The idea in another aspect of the present invention is to simultaneously modulate the amplitude and the phase of an optical field by the polarization multiplexing of a Return-to-Zero (RZ) optical signal and a Return-to-Zero Differential Phase Shift Keying (RZ-DPSK) signal, or the multiplexing of a Carrier Suppressed RZ (CS-RZ) and a Carrier Suppressed RZ-DPSK (CS-RZ-DPSK) optical signal, the two signals having half-bit delay and orthogonal polarization between them. This corresponds to simultaneously modulate an optical field with a first encoded sequence of optical bright pulses, representative of a first tributary, and a second encoded sequence of optical phase, representing a second tributary. In the common RZ modulation format, one of the two logical states (for example the 1) corresponds to the presence of an optical pulse with proper optical power and duration shorter than the bit period $T_B$, the second of the two logical states (for example the 0) corresponds to the absence of pulses, or to a pulse with reduced power. In the common RZ-DPSK format, one of the two logical states corresponds to the presence of an optical pulse with arbitrary optical phase $\phi_0$ (rad), the second of the two logical states corresponds to a pulse with optical phase $\phi_0+\pi$. The common CS technique consists in adding a periodical phase modulation to the pulse train, with $\pi$ phase shift between adjacent bits. The common Non-Return-to-Zero (NRZ) format consists in transmitting a first of the two logical states through a substantially constant optical signal over the whole bit slot $T_B$, and the second of the two logical states through a reduced or absent optical power over the whole bit slot.

In both the said aspects of the present invention, the reached spectral efficiency can overcome the value of 0.8 bit/s/Hz without the need of a polarization controller at the receiver, or 1.6 bit/s/Hz in the first aspect if a polarization controller is used. The invention also relates to the methods to get such efficiency, and to the modulation devices usable for these methods and in the system for the simultaneous modulation of the amplitude and the phase.

The purpose of the invention is the increase of the transmission capacity [bit/s] and of the spectral efficiency [bit/s/Hz] in optical transmission systems, and in some cases the improvement of the system performances respect to the traditional NRZ format. The purpose in one aspect of the invention is also the simplification of the PhIM transmitter scheme respect to the one described by the inventor in Patent Application Publication no. US2003/0147646 A1, using a reduced number of optical modulators and a simplified driving electronics. Besides this, the present invention allows to optically multiplex and de-multiplex, in a single optical WDM channel, from two to four electrical tributaries with bit rate R [bit/s] each. It is possible, for example, to transmit an optical channel with bit rate equal to two times R using, in transmitters and receivers according to the present invention, one or more dual drive optical modulators and electronics with bandwidth comparable with R. A typical application for a first aspect of the invention is, for instance, the transmission of 80 Gbit/s WDM channels with 100 GHz spacing; each channel is obtained by the optical multiplexing of two tributaries at 40 Gbit/s, through the use of only one dual drive modulator and three electrical Exclusive-OR gates with 30-40 GHz cut-off frequency; at receiver side, one standard intensity and one standard DPSK receivers are required with 30-40 GHz cut-off frequency as well.

BRIEF DESCRIPTION OF THE SEVERAL VIEWS OF THE DRAWING

The following figures illustrate better the present invention by way of example and without restrictions, detailed descriptions will be given in the following section.

DETAILED DESCRIPTION OF THE INVENTION

Figure 1:
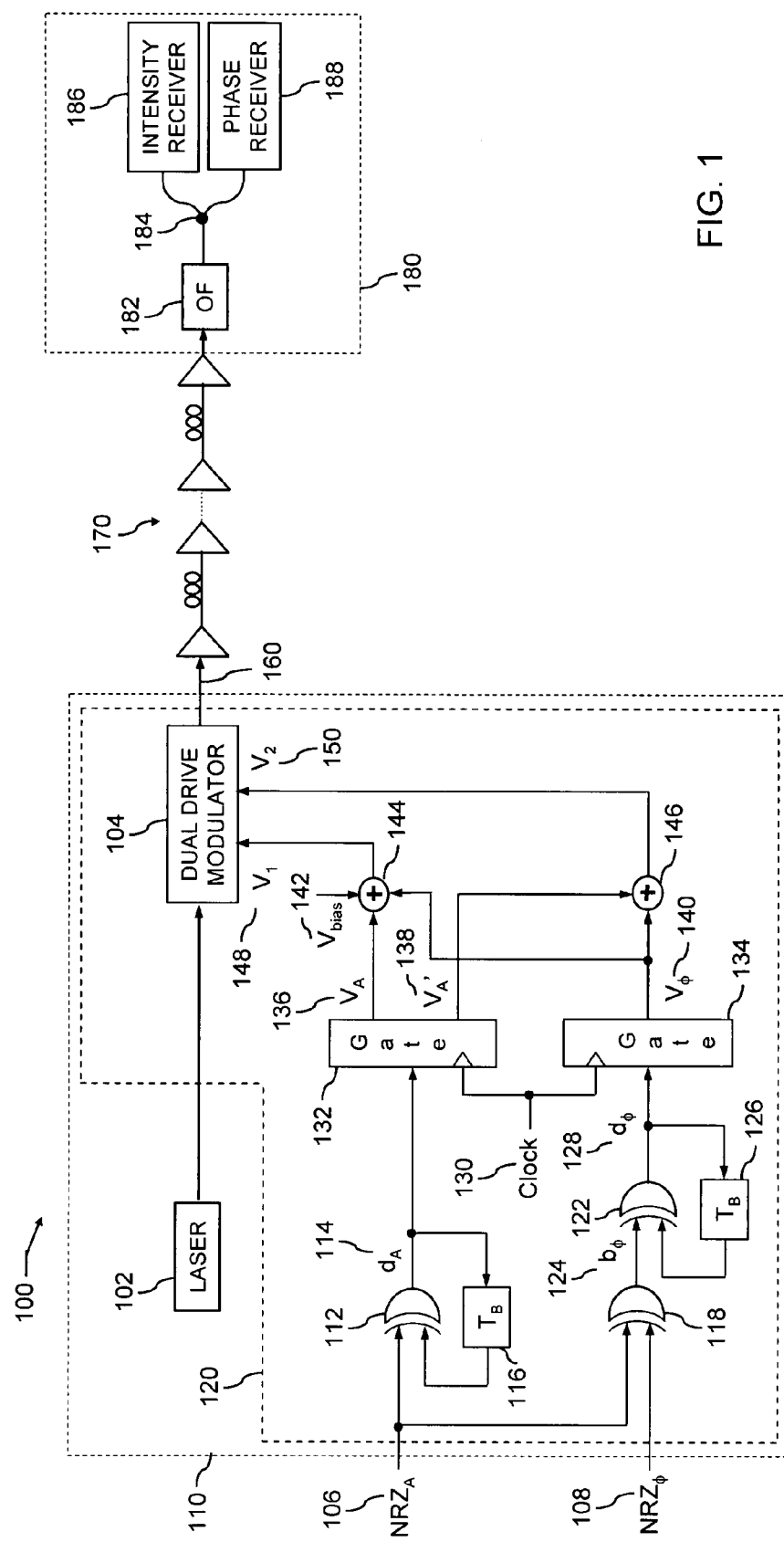
FIG. 1 illustrates a transmission system and a modulation scheme according to a first and a second aspect of the present invention.

The scheme of FIG. 1 describes an optical communication system 100 according to a first aspect of the present invention, the said optical communication system 100 comprising: a first apparatus 110 to transmit at least a digital optical signal 160 with a simultaneous modulation of the amplitude and the phase, an optical transmission line 170, optically connected to the said first apparatus 110, for the propagation of the said optical signal 160 and a second apparatus 180, optically connected to the said optical transmission line 170, to receive the said optical signal 160.

The said first apparatus 110 to transmit an optical signal 160 includes:

a) a laser light source 102, that furnishes a substantially continuous flow of optical radiation to the wavelengths typical of the optical communications, and preferably in the optical fiber third transmission window, in the region of 1500-1600 nm;

b) an optical modulator with dual drive design 104, having at input a substantially continuous flow of optical radiation, to modulate the optical power in the said optical signal 160 with an encoded sequence of dark pulses 328, being representative of a first data electrical signal $NRZ_A$ (Amplitude Tributary, 106), and to simultaneously modulate the optical phase in the said optical signal 160 with a second encoded sequence 330, representative of a second data electrical signal $NRZ_\phi$ (Phase Tributary, 108), the said two sequences 328, 330 having bit rate R and bit period $T_B=1/R$. The said optical modulator 104 is for example of the conventional LiNbO$_3$ Mach Zehnder Interferometric type (MZI); the dual drive design is characterized by having two distinct electrodes where two driving voltages are separately applied. Generally, in the MZI modulator with dual drive design the LiNbO$_3$ crystal orientation is z-cut, with the diffused optical waveguides positioned underneath the two "hot" electrodes (i.e. the electrodes where the two driving voltages are separately applied) instead of the ground electrodes. The optical radiation at the input of the said optical modulator 104 has typically a constant state of polarization;

c) an electrical driving circuit for the said optical modulator 104, having at input the said Amplitude and Phase Tributaries 106, 108, at bit rate R and preferably of type Non-Return-to-Zero (NRZ), and generating two driving electrical signals $V_1$ 148 and $V_2$ 150 applied to the two electrical inputs of the said dual drive modulator 104; the said driving voltages 148, 150 are generated according to the following equations:

$$d_A(t)=NRZ_A(t) \oplus d_A(t-h_1 \cdot T_B)$$

$$b_\phi(t)=NRZ_A(t) \oplus NRZ_\phi(t)$$

$$d_\phi(t)=b_\phi(t) \oplus d_\phi(t-h_2 \cdot T_B)$$

$$V_A(t) = [d_A(t) \cdot V_\pi + V_{cost1}] \cdot \delta_A$$

$$V_\phi(t) = [d_\phi(t) \cdot V_\pi + V_{cost2}] \cdot \delta_\phi$$

$$V_1(t) = V_A(t) + V_\phi(t) + V_{bias}$$

$$V_2(t) = -V_A(t) + V_\phi(t) \quad (1)$$

being $NRZ_A$, $NRZ_\phi$ the normalized versions of the said first data electrical signal 106 and second data electrical signal 108, $d_A$, $b_\phi$ and $d_\phi$ normalized logical signals, $\oplus$ the logical Exclusive-OR (XOR) operator, $V_{bias}$ 142 and $V_\pi$ the said modulator 104 bias and inversion voltages respectively, $T_B$ the tributary bit period, $h_1$ and $h_2$ integer numbers, $V_{cost1}$, $V_{cost2}$ arbitrary offset voltages and $\delta_A$, $\delta_\phi$ arbitrary scaling factors. The inversion voltage $V_\pi$ is defined as the potential difference to be applied to the two electrical inputs of the said modulator 104, in order to get substantially no transmission. Typically, in equations 1 it is $h_1=1$, $h_2=1$, $\delta_A=1$, $\delta_\phi=1$, $V_{cost1}=0$, $V_{cost2}=-V_\pi/2$. The bias voltage is preferably $V_{bias}=-V_\pi$, corresponding to a state of minimum transmission. The driving voltages $V_1$ 148 and $V_2$ 150 applied to the said dual drive modulator 104 are typically synchronous, and are able to produce simultaneously optical dark pulses 328 in the modulated signal 160 and a phase modulation 330 independent of the said dark pulse sequence 328; the optical phase code typically results delayed by $\tau_\phi=T_B/2$ respect to the optical dark pulse code. The amplitude of the optical phase code is preferably $\Delta\phi=\pi$.

The said optical transmission line 170 typically consists of optical fibers resulting monomodal at the transmission wavelength, for example of type NZ-DSF (Non-Zero Dispersion Shifted Fiber) or DS (Dispersion Shifted) or SMF (Standard Monomodal Fiber). The said optical transmission line 170 may also include optical amplifiers, for example of type EDFA (Erbium-Doped Fiber Amplifier) or Raman or of the semiconductor type, inserted in cascade every, for example, 80 km of optical fiber. The said optical transmission line 170 may also include other optical devices like, among the others, multiplexers and de-multiplexers for WDM signals, ADMs (Add-Drop Multiplexers), OXCs (Optical Cross Connects), optical and opto-electronic regenerators.

Figure 4:
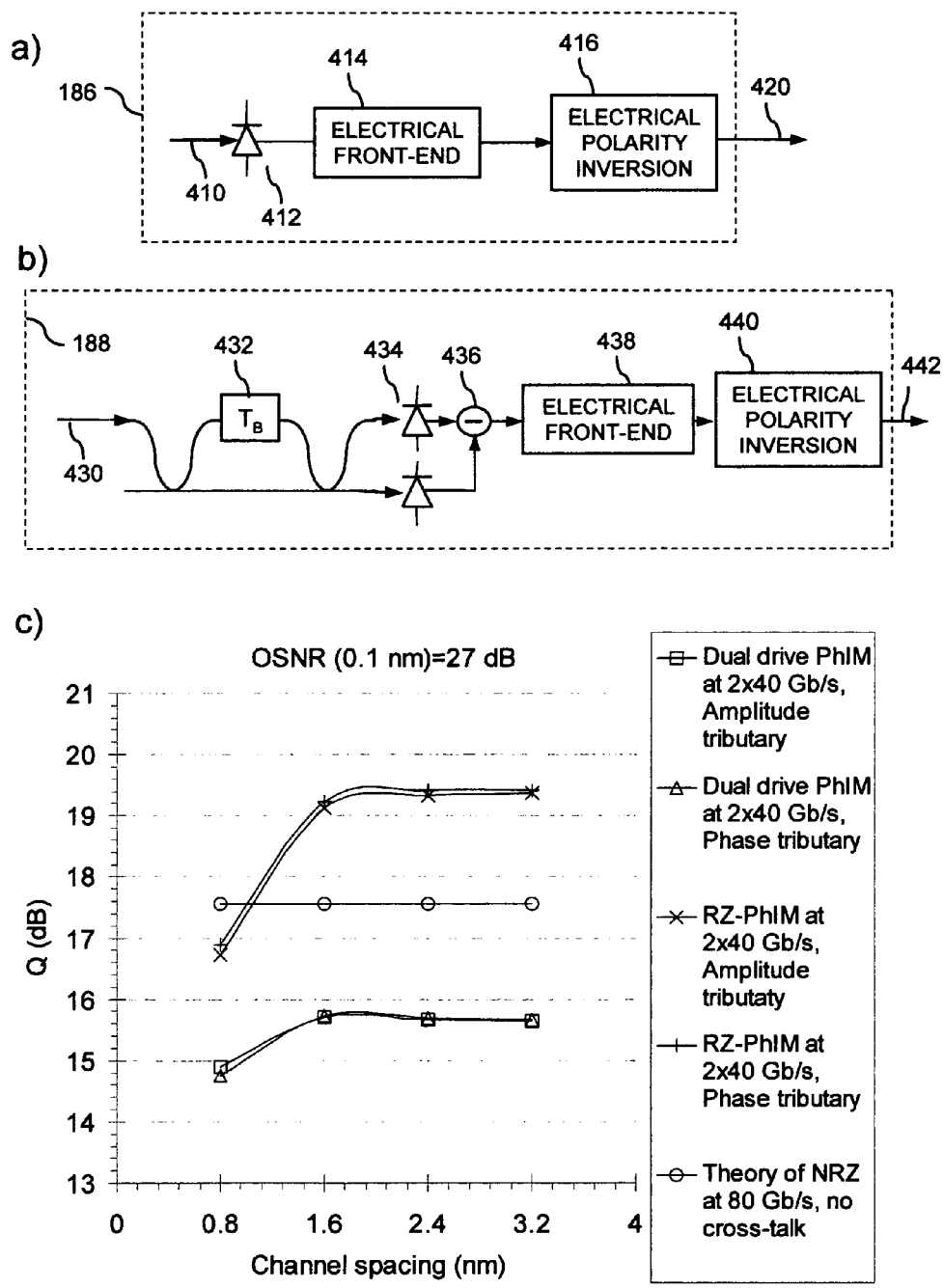
FIGS. 4a and 4b illustrate some schemes of possible receivers of optical intensity and phase to be used in the systems according to the first and third aspect of the present invention.
FIG. 4c reports an example of performances numerically evaluated for a back-to-back WDM system according to the first and third aspect of the present invention.

The said second apparatus 180 to receive the said optical signal 160 includes:

d) an optical filter 182 to select in frequency the said optical signal 160. The said optical filter 182 can be realized, for instance, through a WDM de-multiplexer of type AWG (Arrayed Waveguide Grating), a BG filter (Bragg Grating), and a Fabry Perot or Mach Zehnder interferometric filter;

e) a non-polarizing beam splitter 184 to split the said optical signal 160 and apply the two portions to respectively an optical intensity receiver 186 and an optical phase receiver 188. The said non-polarizing beam splitter 184, can be for example a 1×2 coupler in fused fiber or in waveguide;

f) an optical intensity receiver 186 of type for intensity modulation with direct detection (IM-DD), including an electrical circuit to reverse the polarity of the received electrical signal. A scheme example of the said intensity receiver 186 is shown in FIG. 4a;

g) an optical phase receiver 188, for the phase detection of the said optical signal 160, including an electrical circuit to reverse the polarity of the received electrical signal. A scheme example for the said optical phase receiver 188 is shown in FIG. 4b, for the case of Differential Phase Shift Keying (DPSK), including a delay-and-add interferometer 432 to reveal a differential optical phase.

In equations 1, the Amplitude Tributary signal $NRZ_A$ is differentially pre-encoded through a XOR operation; the obtained signal typically causes the modulated optical field to change sign in correspondence of an amplitude mark; this corresponds to a dark pulse in terms of modulated optical power and to an optical phase jump of $\pi$. The XOR operation between the Amplitude and Phase Tributary signals $NRZ_A$, $NRZ_\phi$ and the following differential pre-encoding are needed to add an independent differential optical phase modulation, also correcting the optical phase jumps of $\pi$ produced by the amplitude modulation. The intensity receiver and the DPSK phase receiver, both with electrical polarity inversion, are thus reproducing the input tributaries $NRZ_A$ and $NRZ_\phi$.

Figure 3:
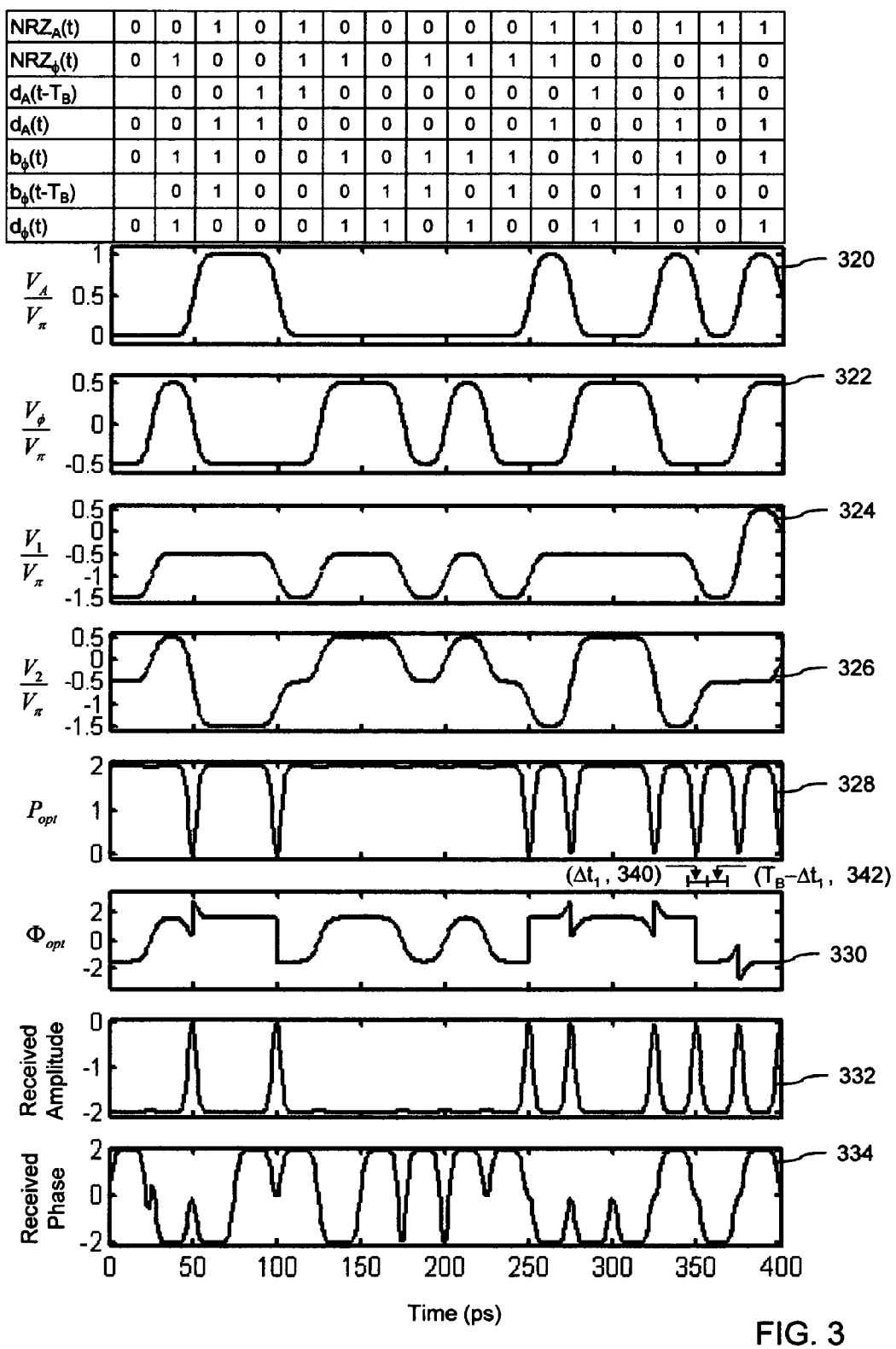
FIG. 3 illustrates an example with some logical and timing diagrams of the optical and electrical signals used in the systems and modulators according to the first and second aspect of the present invention.

FIG. 3 shows an example of the transmitted optical field, with tributaries at R=40 Gbit/s; the table at the top of the figure reports the logical values for the Amplitude and Phase Tributaries $NRZ_A$, $NRZ_\phi$, and the resulting logical signals obtained by the XOR operations in eqs. 1, with $h_1=1$, $h_2=1$; they are also shown the corresponding timing diagrams for $V_A/V_\pi$ 320, $V_\phi/V_\pi$ 322, $V_1/V_\pi$ 324, $V_2/V_\pi$ 326, and for the generated optical power $P_{opt}$ (mW, 328) and phase $\Phi_{opt}$ (rad, 330). The received amplitude (mA, 332) is complementary to the optical power, and reproduces the sequence $NRZ_A$ with $-T_B/2$ delay; the received phase (mA, 334) is differentially decoded by the DPSK receiver and polarity inverted, and reproduces the sequence $NRZ_\phi$ with $-T_B$ delay.

The example of the generated optical power $P_{opt}$ 328 and phase $\Phi_{opt}$ 330 clearly shows to the person with skill in the art that the said optical signal 160 generally don't have a dark soliton modulation format, because not necessarily the optical phase is performing a $\pi$ phase jump in correspondence of an optical dark pulse.

Typically, the said encoded phase modulation 330 in the said optical signal 160 is of Differential Phase Shift Keying (DPSK) type, and the said second electrical data signal 108 is differentially encoded 128 before being applied to the modulator. In the conventional differential encoding, one of the two binary symbols (for instance the logical one) is represented by a transition between the two logical levels of the data signal, while the other binary symbol (for instance the logical zero) is represented by the absence of transition. In the conventional DPSK detection technique, a received optical signal is split in two portions; one is delayed of a bit period $T_B$, the other is directly recombined with the first delayed.

Typically, the said optical phase receiver is of DPSK type.

Typically, the electrical signals at the output of the intensity 420 and phase 442 receivers are of the illustrated type in FIG. 5a, the left figure showing the Amplitude Tributary, the right one the Phase Tributary, and have characteristics similar to the Return-to-Zero (RZ) modulation format. This feature may help using standard RZ electronics on the receivers of the said communication system.

The optical communication system according to the first aspect of the invention has the advantage to double the transport capacity in comparison to a traditional IM-DD system, without necessarily broadening the said optical signal bandwidth, thus increasing the system spectral efficiency [bit/s/Hz]; the said communication system is capable to optically multiplex and de-multiplex an Amplitude Tributary and a Phase Tributary on a same WDM channel. Both the optical power and phase are modulated using one dual drive modulator, thus reducing the transmitter complexity respect to the previous scheme proposed by the inventor in Patent Application Publication no. US2003/0147646 A1, that required the use of two distinct intensity and phase modulators.

The modulation format described by the first aspect of the present invention is referred here as dual drive Phase and Intensity Modulation (dual drive PhIM), since based substantially on the modulation of an Amplitude Tributary, or intensity, and a Phase Tributary using one dual drive optical modulator.

In a second aspect, the present invention relates to a device 120 for modulating a digital optical signal 160 with a simultaneous modulation of the amplitude and the phase, the said device 120 comprising:

a) an optical modulator with dual drive design 104, having at input a substantially continuous flow of optical radiation, to modulate the optical power in the said optical signal 160 with an encoded sequence of dark pulses 328, being representative of a first data electrical signal $NRZ_A$ (Amplitude Tributary, 106), and to simultaneously modulate the optical phase in the said optical signal 160 with a second encoded sequence 330, representative of a second data electrical signal $NRZ_\varphi$ (Phase Tributary, 108), the said two sequences 328, 330 having bit rate R and bit period $T_B=1/R$. The optical radiation at the input of the said optical modulator 104 has typically a constant state of polarization;

b) an electrical driving circuit for the said optical modulator 104, having at input the said Amplitude and Phase Tributaries 106, 108, at bit rate R and preferably of type Non-Return-to-Zero (NRZ), and generating two driving electrical signals $V_1$ 148 and $V_2$ 150 applied to the two electrical inputs of the said dual drive modulator 104. The said driving voltages 148, 150 are generated according to the equations 1; further characteristics of the said device 120 for modulating a digital optical signal 160 have been described in relation to the first aspect of the present invention.

FIG. 1 includes a scheme of the said electrical driving circuit for the said optical modulator 104, according to a first embodiment of the said device 120 for modulating a digital optical signal 160, to be used in the systems and modulators according to the first and second aspect of the present invention. The said electrical driving circuit includes, among the other things:

a) a logical Exclusive-OR (XOR) gate 112 having at input the said first electrical data signal 106 and its output delayed by one bit time $d_A(t-T_B)$ 114, 116. The said logical XOR gate can be realized, for instance, through an integrated GaAs module;

b) a second logical XOR gate 118 having at input the said first and second electrical data signals 106, 108;

c) a third logical XOR gate 122 having at input the output $b_\varphi$ 124 of the said second XOR gate 118 and its output delayed by one bit time $d_\varphi(t-T_B)$ 128, 126;

d) two buffering gates 132, 134 having at input the said signals $d_A$ 114, $d_\varphi$ 128 and a clock signal 130 at frequency R, for the delay recovering and for generating the synchronous signals $V_A$ 136, its complement $-V_A$ 138 and $V_\varphi$ 140, according to eqs. 1. The two buffering gates can be realized, for instance, through D flip-flops and may include electrical delay lines and amplifiers for the delay recovering, and to generate the proper voltage amplitude for the signals $V_A$ and $V_\varphi$. Typically, the generated voltages are $V_A=V_\pi d_A$ 136, its complement $-V_A$ 138 and $V_\varphi=V_\pi d_\varphi - V_\pi/2$ 140, being $V_\pi$ the inversion voltage for the said optical modulator 104;

e) two adder circuits 144, 146, to generate the said modulator driving voltages $V_1=V_A+V_\varphi+V_{bias}$ 148 and $V_2=-V_A+V_\varphi$ 150, $V_{bias}$ being the bias voltage for the said optical modulator 104.

In a second embodiment (not shown) of the said device 120 for modulating a digital optical signal 160, the said electrical driving circuit for the said optical modulator 104 may not include any buffering gate if the signal delay produced by the XOR gates is negligible respect to the bit time $T_B$; the said buffering gates may also be replaced by electrical delay lines.

Preferably, the electrical devices used in the said electrical driving circuit for the said optical modulator 104 have comparable or greater electrical bandwidth to that of the said electrical data signals 106, 108.

Figure 2:
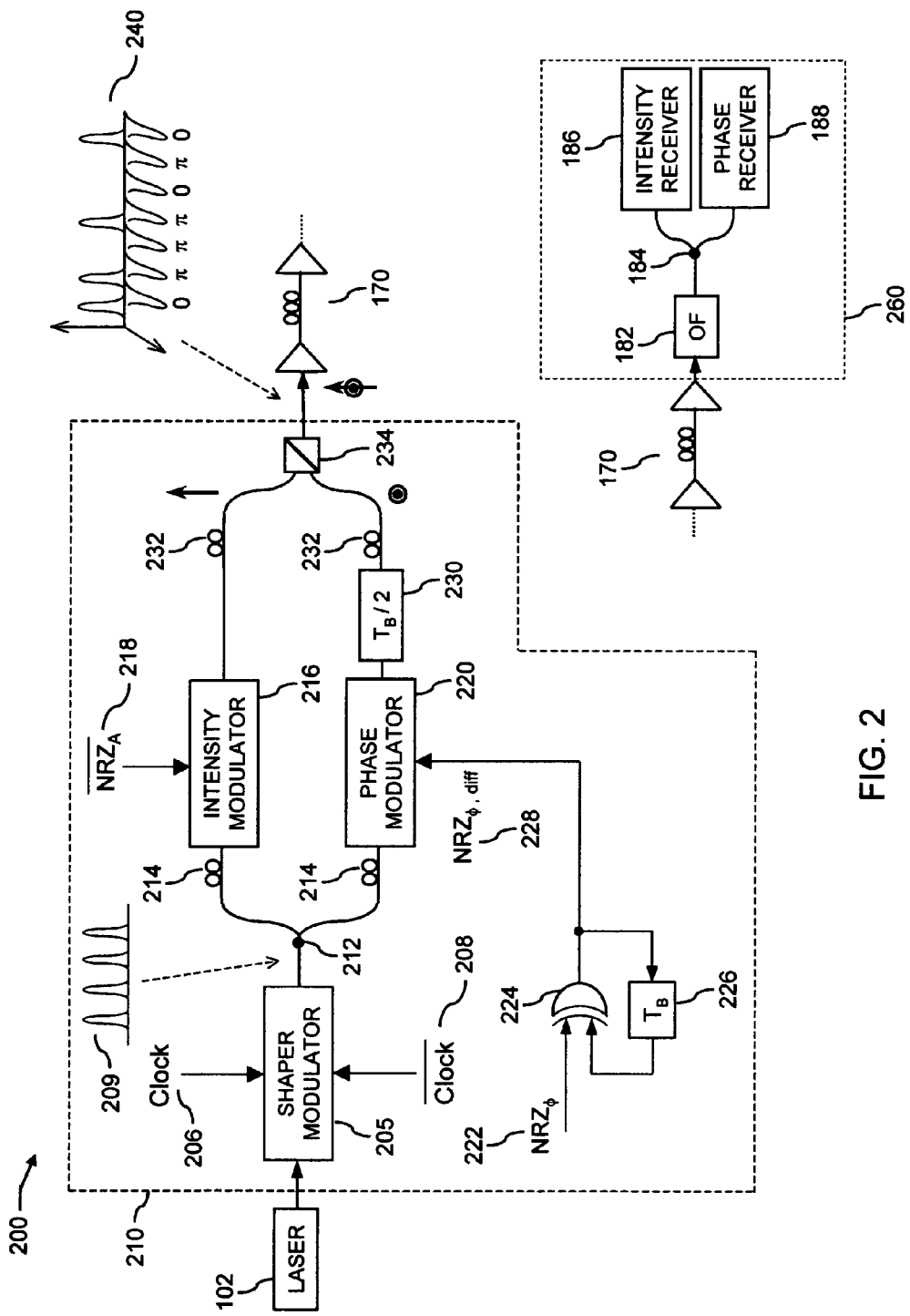
FIG. 2 illustrates a transmission system and a modulation scheme according to a third and a fourth aspect of the present invention.

The scheme of FIG. 2 describes an optical communication system 200 according to a third aspect of the present invention, the said optical communication system 200 comprising: a first apparatus 102, 210 to transmit at least a digital optical signal 240 with a simultaneous modulation of the amplitude and the phase, an optical transmission line 170, optically connected to the said first apparatus 210, for the propagation of the said optical signal 240 and a second apparatus 260, optically connected to the said optical transmission line 170, to receive the said optical signal 240.

The said first apparatus to transmit an optical signal 240 includes:

a) a laser light source 102, that furnishes a substantially continuous flow of optical radiation;

b) an optical shaper modulator 205, having at input a substantially continuous flow of optical radiation, to generate a train of optical pulses 209 of Return-to-Zero type (RZ) or Carrier Suppressed RZ type (CS-RZ), with pulse repetition rate R and pulse period $T_B=1/R$. The said shaper modulator 205 can be for instance of the conventional LiNbO$_3$ Mach Zehnder Interferometric type, with the two driving voltages given by a clock signal 206 with frequency R/2 and amplitude $V_\pi/2$, being $V_\pi$ the inversion voltage, and its logical complement 208; the bias applied to the said modulator is, for example, $V_{bias}=0$ for constant phase RZ, or $V_{bias}=V_\pi$ for Carrier Suppressed RZ;

c) a beam splitter 212 to divide the said pulse train 209 in two portions; the said beam splitter 212 is characterized by a splitting ratio α, defined as the ratio between the optical powers going to the intensity modulator 216 and to the phase modulator 220; the said splitting ratio is preferably in the range between 1 and 1.6, and may also be reached through the use of optical attenuators or amplifiers;

d) an intensity modulator 216, to modulate the optical power in the said pulse train 209 with a first data signal $NRZ_A$ (Amplitude Tributary, 218), or preferably with its logical complement, in order to obtain a first encoded optical signal with RZ or CS-RZ format. The said electrical signal 218 has bit rate R and bit period $T_B=1/R$, and is preferably of NRZ type. The said intensity modulator 216 can be, for instance, of the conventional Mach Zehnder Interferometric type with single or dual drive design. The logical complement of the said first data signal 218 is required when an electrical polarity inversion is performed by the intensity receiver 186, in order to obtain a received Amplitude Tributary eye with upward pulses; the logical complement of the said first data signal may be replaced by a proper choice of the said modulator 216 bias voltage;

e) a phase modulator 220, to modulate the optical phase in the said pulse train 209 with a second data signal $NRZ_\phi$ (Phase Tributary, 222), in order to obtain a second encoded optical signal with phase modulated pulses, and preferably with RZ-DPSK or CS-RZ-DPSK format. The said second electrical signal 222 has bit rate R and bit period $T_B=1/R$; preferably, it is of NRZ type and is differentially pre-encoded through the use of an XOR gate 224 and an electrical delay line 226, thus obtaining the differential driving voltage $NRZ_{\phi, diff}$ 228 applied to the said modulator 220. The said phase modulator 220 can be, for example, of the conventional Mach Zehnder Interferometric type with dual drive design, with the two driving voltages given by the said signal $NRZ_{\phi, diff}$ 228 and its logical complement;

f) an optical delay line 230, to delay the phase modulated pulse train respect to the intensity modulated one by a time $(h+1/2)T_B$, being h an integer number. The said delay line 230 may also be replaced by optical waveguides or fibers with different length at the input or output of the modulators 216, 220. The phase modulated pulse train typically results delayed by $\tau_\phi=T_B/2$ respect to the intensity modulated pulse sequence. The amplitude of the optical phase code is preferably $\Delta\phi=\pi$;

g) a polarizing coupler 234 to recombine the obtained two pulsed sequences with orthogonal polarizations between them and temporally interleaved, the said coupler 234 having at output the said digital optical signal 240.

The pulse train 240 in FIG. 2 illustrates the said encoded digital optical signal 240 by way of example and without restrictions. The use of polarization preserving fibers or polarization controllers 214, 232 is generally needed to maintain the linear polarizations of the two pulse sequences at the output of the said modulators 216, 220.

The said optical transmission line 170 characteristics have already been described in relation to the first aspect of the present invention, FIG. 1.

The said second apparatus 260 to receive the said optical signal 240 includes:

h) an optical filter 182 to select in frequency the said optical signal 240;

i) a non-polarizing beam splitter 184 to split the said optical signal 240 and apply the two portions to respectively an optical intensity receiver 186 and an optical phase receiver 188;

l) an optical intensity receiver 186 of type for intensity modulation with direct detection (IM-DD), including an electrical circuit to reverse the polarity of the received electrical signal. A scheme example of the said intensity receiver 186 is shown in FIG. 4a;

m) an optical phase receiver 188, for the phase detection of the said optical signal 240, including an electrical circuit to reverse the polarity of the received electrical signal. A scheme example for the said optical phase receiver 188 is shown in FIG. 4b, for the case of Differential Phase Shift Keying (DPSK), including a delay-and-add interferometer 432 to reveal a differential optical phase. In order to have upward pulses in the received Phase Tributary eye, the said polarity inversion for the phase signal should not be applied if the said optical pulse train 209 is of Carrier Suppressed RZ type; in alternative, the logical complement of the Phase Tributary may be applied at the said phase modulator 220.

Further characteristics of system in FIG. 2 have been described in relation to the first and the second aspect of the present invention; for the details, reference should be made to the preceding text.

Typically, the said encoded phase modulation in the said optical signal 240 is of Differential Phase Shift Keying (DPSK) type, and the said second electrical data signal 222 is differentially encoded 224, 226 before being applied to the modulator.

Typically, the said optical phase receiver 188 is of DPSK type.

Typically, the electrical signals at the output of the intensity 420 and phase 442 receivers are of the illustrated type in FIG. 5b when the said beam splitter 212 has splitting ratio $\alpha=1$, and in FIG. 5c for a splitting ratio $\alpha=1.5$, the left figure showing the Amplitude Tributary, the right showing the Phase Tributary. Received eyes have characteristics similar to those of the dual drive PhIM case, and to the RZ format.

The modulation format described by the third aspect of the present invention is referred here as Return-to-Zero Phase and Intensity Modulation (RZ-PhIM), because it is based substantially on the polarization multiplexing and time interleaving of a RZ signal and a RZ-DPSK signal, or the multiplexing of a CS-RZ and a CS-RZ-DPSK signal.

Although the said RZ-PhIM signal is based on a polarization multiplexing, it must be emphasized that no polarization controller is needed, and that both the dual drive PhIM and the RZ-PhIM require the same receiver scheme.

In a fourth aspect, the present invention relates to a device 210 for modulating a digital optical signal 240 with a simultaneous modulation of the amplitude and the phase, the said device 210 comprising:

a) an optical shaper modulator 205, having at input a substantially continuous flow of optical radiation, to generate a train of optical pulses 209 of Return-to-Zero type (RZ) or Carrier Suppressed RZ type (CS-RZ), with pulse repetition rate R and pulse period $T_B=1/R$;

b) a beam splitter 212 to divide the said pulse train 209 in two portions with a splitting ratio $\alpha$; the said splitting ratio is preferably in the range between 1 and 1.6;

c) an intensity modulator 216, to modulate the optical power in the said pulse train 209 with a first data signal $NRZ_A$ (Amplitude Tributary, 218), or preferably with its logical complement. The said electrical signal 218 has bit rate R and bit period $T_B=1/R$, and is preferably of NRZ type. The logical complement of the said first data signal 218 is required when an electrical polarity inversion is performed by the intensity receiver 186, in order to obtain a received Amplitude Tributary eye with upward pulses;

d) a phase modulator 220, to modulate the optical phase in the said pulse train 209 with a second data signal $NRZ_\phi$ (Phase Tributary, 222). The said second electrical signal 222 has bit rate R and bit period $T_B=1/R$; preferably, it is of NRZ type and is differentially pre-encoded through the use of an XOR gate 224 and an electrical delay line 226, thus obtaining the differential driving voltage $NRZ_{\phi, diff}$ 228 applied to the said modulator 220;

e) an optical delay line 230, to delay the phase modulated pulse train respect to the intensity modulated one by a time $(h+1/2)T_B$, being h an integer number. The phase modulated pulse train typically results delayed by $\tau_\phi = T_B/2$ respect to the intensity modulated pulse sequence. The amplitude of the optical phase code is preferably $\Delta\phi = \pi$;

f) a polarizing coupler 234 to recombine the obtained two pulsed sequences with orthogonal polarizations between them and temporally interleaved, the said coupler 234 having at output the said digital optical signal 240.

The use of polarization preserving fibers or polarization controllers 214, 232 is generally needed in the said device 210, to maintain the linear polarizations of the two pulse sequences at the output of the said modulators 216, 220.

Further characteristics of the said device 210 for modulating a digital optical signal 240 have been described in relation to the third and first aspect of the invention.

In a further embodiment (not shown) of the optical communication system according to a first aspect of the present invention, two digital optical signals 160 at the same wavelength are modulated with a simultaneous modulation of the amplitude and the phase, by two devices 120 according to the said second aspect of the present invention; the said two signals 160 are multiplexed according to the common technique of the Polarization Domain Multiplexing (PDM) by a polarizing coupler, that combines them with orthogonal polarizations. At the receiver, one or more polarization controllers are needed, capable to substantially recover the initial power distribution between the two linear polarization components of the transmitted signal; the said polarization controllers can be, for instance, of the Heismann type. Two linear analyzers are used at the receiver to select the first and the second of the said two linear polarization components on which the said optical signal power is distributed. Two non-polarizing beam splitters are then used to split the optical power of the said linear polarization components and to apply the obtained portions respectively to two optical intensity receivers 186 and two optical phase receivers 188.

The optical communication system according to the said further embodiment is based on the polarization multiplexing of two dual drive PhIM signals; it has the advantage to quadruple the transport capacity respect to a traditional IM-DD system, without necessarily broadening the said optical signal bandwidth, therefore increasing the spectral efficiency of the system; the said communication system is able to optically multiplex and de-multiplex two Amplitude Tributaries and two Phase Tributaries on a same WDM channel. The two polarization multiplexed dual drive PhIM signals have preferably, but not necessarily, same tributary bit rate R.

FIG. 4a shows a possible simplified scheme of the said optical intensity receiver 186, of the type for IM-DD signals, to be used in the systems according to the first and third aspect of the present invention. The said optical intensity receiver 186 includes, among the other things:

a) a high speed photodiode 412, for instance of PIN type, to convert the arriving optical signal 410 into a proportional electrical signal;

b) an electrical front-end 414 comprising, among the others, an electrical amplifier and a low-pass electrical filter. The said electrical filter can be, for example, a fourth order Bessel Thompson with bandwidth comparable with R;

c) an electrical circuit 416 for the polarity inversion of the received electrical signal, to produce an output electrical signal 420 similar to the Return-to-Zero (RZ) format, like in the example shown in FIGS. 5a to 5c, left figures.

FIG. 4b illustrates a possible simplified scheme of the said optical phase receiver 188, for the differential phase case (DPSK), to be used in the systems according to the first and third aspect of the present invention. The said receiver of optical phase 188 includes, among the other things:

a) a delay-and-add interferometer 432, with delay equal to $T_B$ at one arm, to split the incoming optical field and recombine one portion with the other delayed;

b) two high speed photodiodes 434, for instance of type PIN, to convert the two optical signals coming from the said interferometer 432 in two proportional electrical signals;

c) a subtraction circuit 436, to subtract the two said electrical signals. If $E_x(t)$, $E_y(t)$ are the complex amplitudes for the two polarization components of the incoming optical field 430, the electrical signal at the said subtraction 436 output is proportional to $Re[E_x(t)E_x^*(t-T_B)] + Re[E_y(t)E_y^*(t-T_B)]$;

d) an electrical front-end 438 comprising, among the others, an electrical amplifier and a low-pass electrical filter. The said electrical filter can be, for instance, a fourth order Bessel Thompson with bandwidth comparable with R;

e) an electrical circuit 440 for the polarity inversion of the received electrical signal, to produce an output electrical signal 442 similar to the Return-to-Zero (RZ) format, like in the example shown in FIGS. 5a to 5c, right figures.

The receiver schemes shown in FIGS. 4a and 4b, excluded the circuits for the polarity inversion 416 and 440, are well known in literature and are not object of the present invention.

The optical communication systems according to the first and third aspect of the present invention are typically used for the wavelength division multiplexing (WDM) transmission with high spectral efficiency. In a further embodiment (not shown), the said systems may include more apparatuses to transmit a plurality of optical signals 160 or 240 at different wavelengths, more apparatuses to receive the amplitude and phase tributaries of the said optical signals, and conventional wavelength multiplexers and de-multiplexers to simultaneously transmit the said optical signals in the said transmission line 170.

In a fifth aspect, the present invention relates to a method for transmitting a digital optical signal 160 with a simultaneous modulation of the amplitude and the phase, comprising the steps of:

a) modulating both the intensity and the phase of a substantially continuous flow of optical radiation, using a single optical modulator with dual drive design 104, to produce a first encoded sequence of dark pulses 328 and a second encoded sequence of optical phase 330 in the said optical signal 160;

b) the said encoded sequence of dark pulses 328 being representative of a first data sequence (Amplitude Tributary, 106) and having:

b1) bit rate R and bit period $T_B = 1/R$, b2) reduced or zero optical intensity over a certain portion $\Delta t_1$ 340 of the bit period $T_B$, in correspondence of the bits of the said first data sequence 106 which are equal to a first of the two logical states (for example, the 1), b3) nearly unperturbed intensity, in correspondence of the bits of the said first data sequence 106 which are equal to the second of the two logical states (for example, the 0), b4) in every case, nearly unperturbed intensity on a portion $T_B-\Delta t_1$ 342 of the bit period $T_B$;

c) the said encoded sequence of optical phase 330 being representative of a second data electrical signal (Phase Tributary, 108) and characterized by:

c1) having bit rate R, amplitude $\Delta\phi$, bit period $T_B=1/R$ and delay $\tau_\phi$ respect to the said encoded sequence of dark pulses 328, c2) using the said portion $T_B-\Delta t_1$ 342 of the bit period $T_B$ to add a phase code representative of the said second data sequence 108.

Typically, the said encoded phase modulation 330 in the said optical signal 160 is of differential (DPSK) type.

Preferably, the amplitude $\Delta\phi$ of the said encoded phase modulation 330 is less than or equal to $\pi$, and delay $\tau_\phi$ respect to the said encoded sequence of dark pulses 328 is approximately equal to $(h+1/2)T_B$, with h an integer number.

In a sixth aspect, the present invention relates to a method for transmitting a digital optical signal 240 with a simultaneous modulation of the amplitude and the phase, comprising the steps of:

a) generating a first Return-to-Zero (RZ) optical signal, representative of a first data sequence (Amplitude Tributary, 218) and having:

a1) bit rate R and bit period $T_B=1/R$, a2) nearly unperturbed optical pulses in correspondence of the bits of the said first data sequence 218 which are equal to a first of the two logical states (for example, the 0), a3) reduced power pulses or absence of optical pulses in correspondence of the bits of the said first data sequence 218 which are equal to the second of the two logical states (for example, the 1);

b) generating a second optical signal by a phase modulated pulse train, and preferably with Return-to-Zero Differential Phase Shift Keying (RZ-DPSK) format, representative of a second data sequence (Phase Tributary, 222) and having:

b1) bit rate R and bit period $T_B=1/R$, b2) delay $\tau_\phi$ respect to the said first optical signal, b3) optical pulses with $\phi_0$ optical phase in correspondence of the bits of the said second data sequence 222 which are related to a first of the two logical states, b4) optical pulses with $\phi_0+\Delta\phi$ optical phase in correspondence of the bits of the said second data sequence 222 which are related to the second of the two logical states, b5) in any case, optical pulses having peak power equal to $1/\alpha$ times the peak power of the said first optical signal, being $\alpha$ a positive number;

c) polarization multiplexing the said first and second optical signals, with orthogonal polarizations between them and interleaved in time.

Typically, the said encoded phase modulation in the said second optical signal is of differential (DPSK) type, and the said second data signal 222 is differentially pre-encoded.

Preferably, the amplitude $\Delta\phi$ of the said second optical signal is less than or equal to $\pi$, and delay $\tau_\phi$ respect to the said first optical signal is approximately equal to $(h+1/2)T_B$, with h an integer number.

The said first optical signal can alternatively be of Carrier Suppressed RZ type, and the said second optical signal of Carrier Suppressed RZ-DPSK type.

In all the aspects of the present invention, the optical connections among the said laser source and optical modulators are for instance implemented through the use of polarization maintaining optical fibers, or by fiber polarization controllers, to maintain a constant state of polarization at the modulator input.

Figure 5:
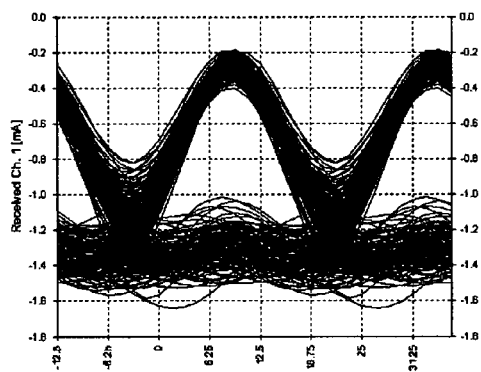
FIG. 5 shows some eye diagrams numerically evaluated for systems of the type of FIG. 1 and FIG. 2.
Figure 5:
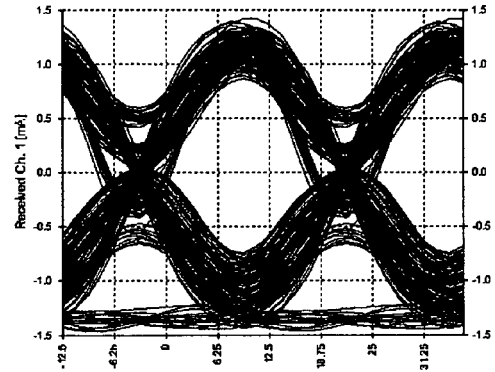
Figure 5:
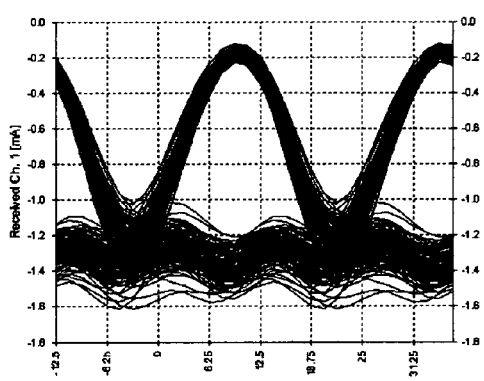
Figure 5:
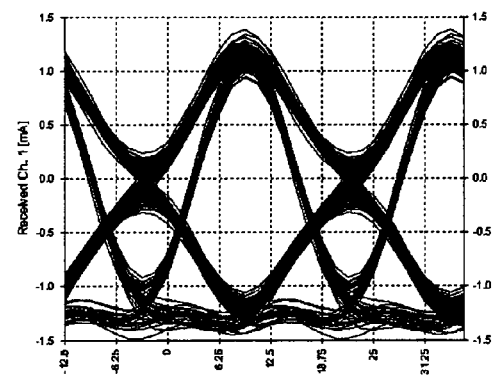
Figure 5:
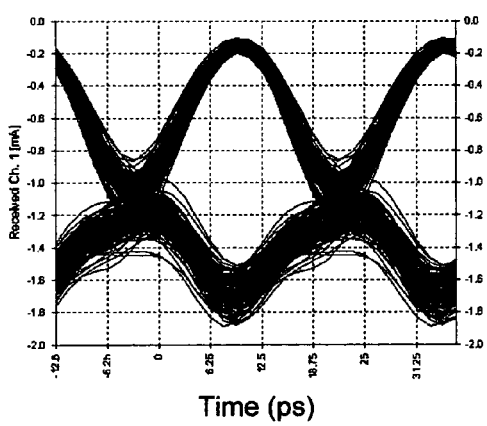
Figure 5:
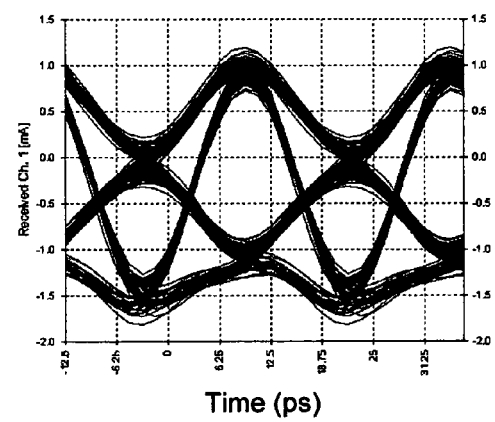

Detailed description of FIG. 4c and FIG. 5 is postponed to the text below.

NUMERCIAL RESULTS

The inventor has performed extensive numerical simulations, in order to test the performances of dual drive PhIM and RZ-PhIM systems according to the first and third aspect of the present invention. The model used for the transmission line 170 is the nonlinear Schrödinger equation in its most general vectorial form, numerically integrated through the well-known Fourier beam propagation method (BPM). The models for the system physical effects have been chosen among the most accurate in the literature, including: group velocity dispersion (GVD) of second and third order, optical Kerr and Raman nonlinearity, polarization mode dispersion (PMD), linear attenuation, amplified spontaneous emission (ASE) noise in the optical amplifiers, the models for the optical and opto-electronic components with their finite bandwidths.

In dual drive PhIM, the simulated transmitters have the scheme 110 of FIG. 1; the used modulator is modeled at the minimum transmission bias, with output optical field:

$$E_{out}(t)=E_{in}\cdot(0.5\cdot\exp(i\cdot\pi\cdot(V_A+V_\phi)/V_\pi)+0.5\cdot((\sqrt{er}-1)/(\sqrt{er}+1))\cdot\exp(i\cdot\pi\cdot(-V_A+V_\phi)/V_\pi)), \quad (2)$$

where $V_A$, $V_\phi$ are given by eqs. 1 with $h_1=1$, $h_2=1$, $\delta_A=1$, $\delta_\phi=1$, $V_{cost1}=0$, $V_{cost2}=-V_\pi/2$, $V_{bias}=-V_\pi$; er is the modulator extinction ratio in linear scale. The used transmitters have tributary bit rate R=40 Gbit/s (80 Gbit/s per channel); the electrical signals and the transmitted channel optical field are similar to those shown in FIG. 3; the resulting optical phase modulation is of differential (DPSK) type, with amplitude $\Delta\phi=\pi$ and a half bit delay respect to the intensity code; the rise times for the amplitude driver $V_A$ 136 and phase driver $V_\phi$ 140 are 20 and 10 ps respectively, and the modulator extinction ratio is 15 dB.

In RZ-PhIM, transmitters have the scheme 210 of FIG. 2, and the shaper modulator 208 generates a pulse train according to the equation:

$$E_{out}(t)=E_{in}\cdot\cos(0.5\cdot\pi\cdot\sin(\pi\cdot R\cdot t)) \quad (3)$$

The intensity modulator 216 is modeled with no chirp, and the phase modulator 220 generates an optical phase proportional to the NRZ signal 228, i.e. producing RZ-DPSK pulses. Pulses have tributary bit rate R=40 Gbit/s (80 Gbit/s per channel) and 8.3 ps pulsewidth; the peak power of the intensity modulated pulses is 1.5 times the one of the phase modulated pulses; the data intensity modulator 216 has 15 dB extinction ratio.

A back-to-back numerical test with WDM cross talk is performed both in dual drive PhIM and in RZ-PhIM. Three channels are multiplexed with variable spacing; multiplexer sets the adjacent channels with orthogonal polarizations between them; this is typically obtained through the use of two polarization-maintaining Arrayed Waveguide Gratings, interleaved by a polarizing beam coupler. Central channel is at 1550 nm wavelength; the input multiplexer transfer function is modeled as a $3^{rd}$ order Gaussian optical filter with bandwidth equal to 1.5 times the channel spacing.

Transmission line consists of a fiber with negligible dispersive and nonlinear effects and a 25 dB attenuation; birefringence axes are randomly rotated along the line in order to produce signals with a random state of polarization at the receiver. Fiber is followed by an EDFA pre-amplifier, in order to have at output a 27 dB OSNR over 0.1 nm.

For both cases, receiver has the scheme 180 in FIG. 1, and 186, 188 in FIGS. 4a, 4b; it includes a $3^{rd}$ order Gaussian optical filter with bandwidth optimized for several channel spacings, between 80 and 120 GHz. The electrical front-end cut-off frequency is 35 GHz for both the intensity and the phase receivers.

A comparison is performed with the most accurate theory of a back-to-back system transmitting a NRZ signal at 80 Gbit/s, with 15 dB extinction ratio, and using an intensity receiver with 70 GHz electrical front-end cut-off frequency. No cross talk and no optical filtering penalty are considered by the theory.

Performances are evaluated in terms of $Q^2$ factor on the received electrical eye diagrams, for the amplitude and phase tributaries. Q factor is conventionally defined by the expression $Q=|m_1-m_0|/(\sigma_1+\sigma_0)$, where $m_1$, $m_0$, $\sigma_1$, $\sigma_0$ are respectively the average and standard deviation for the high and low levels of the received electrical eyes. Assuming a decision threshold with Gaussian distribution, an error-free transmission, that is with bit error rate (BER) conventionally less than $10^{-9}$, corresponds to a $Q^2$ greater than 15.6 dB. It has been shown in the literature [G. Bosco et al., "On the accuracy of the Q-parameter to assess BER in the numerical simulation of optical DPSK systems", proc. of "ECOC 2003", Rimini, Italy] that the Q factor evaluated using the Gaussian approximation may be underestimated by 2-3 dB in DPSK systems; the obtained results for the Phase Tributary should then be considered as a worst-case in the following.

FIG. 4c shows the evaluated Q factors for the Amplitude and the Phase Tributary of the central channel, at several channel spacings and for both dual drive PhIM and RZ-PhIM. The dual drive PhIM shows top performances reduced by 2 dB respect to the NRZ theory, and a 1 dB cross-talk penalty when the channel spacing is reduced to 0.8 nm (0.8 bit/s/Hz spectral efficiency); the NRZ signal would instead have prohibitive cross-talk penalties at the 0.8 efficiency. The RZ-PhIM shows on the contrary a 1.8 dB performance improvement respect to the NRZ theory, even if no cross-talk is considered for the NRZ case; the better performances respect to the dual drive PhIM are given at the expense of a greater transmitter complexity in RZ-PhIM, that requires the use o three modulators instead of one.

The received eyes for the dual drive PhIM and the RZ-PhIM cases are similar to those shown in FIGS. 5a and 5c respectively, the left figures for the Amplitude Tributary, the right ones for the Phase Tributary.

Several changes and adaptations may be made to the present invention by persons with skill in the art. Therefore, the scope of the invention is defined by the appended claims and all changes and modifications falling within the equivalence of the scope of the claims are to be embraced by the invention.

I claim:

1. An optical communication system (100) comprising:
  a first apparatus (110) to transmit at least a digital optical signal (160) with a simultaneous modulation of the amplitude and the phase, the said first apparatus (110) comprising:
    a) a laser light source (102), that furnishes a substantially continuous flow of optical radiation,
    b) an optical modulator with dual drive design (104), having at its input a substantially continuous flow of optical radiation, to modulate the optical power in the said optical signal (160) with an encoded sequence of dark pulses (328), being representative of a first Non-Return-to-Zero (NRZ) data electrical signal $NRZ_A$, referred below as Amplitude Tributary (106), and to simultaneously modulate the optical phase in the said optical signal (160) with a second encoded sequence (330), representative of a second NRZ data electrical signal $NRZ_\phi$, referred below as Phase Tributary (108), the said two sequences (328, 330) having bit rate R and bit period $T_B=1/R$,
    c) an electrical driving circuit for the said optical modulator (104), having at its input the said Amplitude and Phase Tributaries (106, 108) at bit rate R, and generating two driving electrical signals $V_1$ (148) and $V_2$ (150) applied to the two electrical inputs of the said dual drive modulator (104);
  an optical transmission line (170), optically connected to the said first apparatus (110), for the propagation of the said optical signal (160);
  a second apparatus (180), optically connected to the said optical transmission line (170), to receive the said optical signal (160), the said second apparatus (180) comprising:
    d) an optical filter (182) to select in frequency the said optical signal (160),
    e) a non-polarizing beam splitter (184) to split the said optical signal (160) and apply the two portions to respectively an optical intensity receiver (186) and an optical phase receiver (188),
    f) an optical intensity receiver (186) of type for intensity modulation with direct detection (IM-DD),
    g) an optical phase receiver (188), for the phase detection of the said optical signal (160).

2. An optical communication system (100) according to claim 1, characterized in that the said electrical driving circuit for the said optical modulator (104) comprises:
  a) a logical Exclusive-OR (XOR) gate (112) having at its input the said first electrical data signal (106) and its output $d_A$ delayed by one bit time (114, 116),
  b) a second logical XOR gate (118) having at its input the said first and second electrical data signals (106, 108),
  c) a third logical XOR gate (122) having at its input the output $b_\phi$ (124) of the said second XOR gate (118) and its output $d_\phi$ delayed by one bit time (128, 126),
  d) two buffering gates (132, 134) having at its input the said signals $d_A$ (114), $d_\phi$ (128) and a clock signal at frequency R (130), for the delay recovering and for generating the synchronous signals $V_A=V_\pi d_A$ (136), its complement $-V_A$ (138) and $V_\phi=V_\pi d_\phi-V_\pi/2$ (140), $V_\pi$ being the inversion voltage for the said optical modulator (104),
  e) two adder circuits (144, 146), to generate the said modulator driving voltages $V_1=V_A+V_\phi+V_{bias}$ (148) and $V_2=-V_A+V_\phi$ (150), $V_{bias}$ being the bias voltage for the said optical modulator (104).

3. An optical communication system (100) according to claim 1, characterized in that the said encoded phase modulation sequence (330) in the said optical signal (160) and the said optical phase receiver (188) are of Differential Phase Shift Keying (DPSK) type.

4. An optical communication system (100) according to claim 2, characterized in that the said bias voltage $V_{bias}$ (142) for the said optical modulator (104) equals $-V_\pi$.

5. A device (120) for modulating a digital optical signal (160) with a simultaneous modulation of the amplitude and the phase, the said device (120) comprising an electrical driving circuit for the optical modulator (104) characterized by:

a) a logical Exclusive-OR (XOR) gate (112) having at its input the said first electrical data signal (106) and its output $d_A$ delayed by one bit time (114, 116), b) a second logical XOR gate (118) having at its input the said first and second electrical data signals (106, 108), c) a third logical XOR gate (122) having at its input the output $b_\phi$ (124) of the said second XOR gate (118) and its output $d_\phi$ delayed by one bit time (128, 126), d) two buffering gates (132, 134) having at its input the said signals $d_A$ (114), $d_\phi$ (128) and a clock signal at frequency R (130), for the delay recovering and for generating the synchronous signals $V_A = V_\pi d_A$ (136), its complement $-V_A$ (138) and $V_\phi = V_\pi d_\phi - V_\pi/2$ (140), $V_\pi$ being the inversion voltage for the said optical modulator (104), e) two adder circuits (144, 146), to generate the said modulator driving voltages $V_1 = V_A + V_\phi + V_{bias}$ (148) and $V_2 = -V_A + V_\phi$ (150), $V_{bias}$ being the bias voltage for the said optical modulator (104).

6. A device (120) for modulating a digital optical signal (160) according to claim 5, characterized in that the said bias voltage $V_{bias}$ (142) for the said optical modulator (104) equals $-V_\pi$.

7. An apparatus (110) to transmit at least a digital optical signal (160) with a simultaneous modulation of the amplitude and the phase, the said apparatus (110) comprising:

a) a laser light source (102), that furnishes a substantially continuous flow of optical radiation, b) a device (120) for modulating a digital optical signal (160) according to claim 5, having at its input a substantially continuous flow of optical radiation.

8. An optical communication system (200) comprising:

a first apparatus (102, 210) to transmit at least a digital optical signal (240) with a simultaneous modulation of the amplitude and the phase, the said apparatus comprising:

a) a laser light source (102), that furnishes a substantially continuous flow of optical radiation, b) an optical shaper modulator (205), having at its input a substantially continuous flow of optical radiation, to generate a train of optical pulses (209) of Return-to-Zero type (RZ) or Carrier Suppressed RZ type (CS-RZ), with pulse repetition rate R and pulse period $T_B = 1/R$, c) a beam splitter (212) to divide the said pulse train (209) in two portions; the said beam splitter (212) having a splitting ratio $\alpha$, d) an intensity modulator (216), to modulate the optical power in the said pulse train (209) with a first NRZ data signal $NRZ_A$, referred below as Amplitude Tributary (218), having bit rate R and bit period $T_B = 1/R$, e) a phase modulator (220), to modulate the optical phase in the said pulse train (209) with a second NRZ data signal $NRZ_\phi$, referred below as Phase Tributary (222), having bit rate R and bit period $T_B = 1/R$, the said optical phase modulation having amplitude $\Delta\phi$, f) an optical delay line (230), to delay the phase modulated pulse train with respect to the intensity modulated pulse sequence by a time $(h+1/2)T_B$, h being an integer number, g) a polarizing coupler (234) to recombine the obtained two pulsed portions making them orthogonally polarized and temporally interleaved, the said coupler (234) having at its output the said digital optical signal (240);

an optical transmission line (170), optically connected to the said first apparatus (210) for the propagation of the said optical signal (240);

a second apparatus (260), optically connected to the said optical transmission line (170), to receive the said optical signal (240), the said second apparatus (260) comprising:

h) an optical filter (182) to select in frequency the said optical signal (240), i) a non-polarizing beam splitter (184) to split the said optical signal (240) and apply the two portions to respectively an optical intensity receiver (186) and an optical phase receiver (188), l) an optical intensity receiver (186) of type for intensity modulation with direct detection (IM-DD), m) an optical phase receiver (188), for the phase detection of the said optical signal (240).

9. An optical communication system (200) according to claim 8, characterized in that the said Amplitude Tributary (218) is logically complemented, and the said intensity receiver (186) includes an electrical circuit for reversing the polarity of the received electrical signal.

10. An optical communication system (200) according to claim 8, characterized in that the said Phase Tributary is differentially pre-encoded (228), and the said optical phase receiver (188) is of differential phase modulation (DPSK) type.

11. An optical communication system (200) according to claim 10, characterized in that the said Phase Tributary (228) is logically complemented.

12. An optical communication system (200) according to claim 10, characterized in that the said optical phase receiver (188) includes an electrical circuit for reversing the polarity of the received electrical signal.

13. An optical communication system (200) according to claim 10, characterized in that the said optical phase modulator (220) modulates the optical phase with amplitude $\Delta\phi = \pi$.

14. A device (210) for modulating a digital optical signal (240) with a simultaneous modulation of the amplitude and the phase, the said device (210) comprising:

a) an optical shaper modulator (205), having at its input a substantially continuous flow of optical radiation, to generate a train of optical pulses (209) of Return-to-Zero type (RZ) or Carrier Suppressed RZ type (CS-RZ), with pulse repetition rate R and pulse period $T_B = 1/R$, b) a beam splitter (212) to divide the said pulse train (209) in two portions; the said beam splitter (212) having a splitting ratio $\alpha$, c) an intensity modulator (216), to modulate the optical power in the said pulse train (209) with a first NRZ data signal $NRZ_A$, referred below as Amplitude Tributary (218), having bit rate R and bit period $T_B = 1/R$, e) a phase modulator (220), to modulate the optical phase in the said pulse train (209) with a second NRZ data signal $NRZ_\phi$, referred below as Phase Tributary (222), having bit rate R and bit period $T_B = 1/R$, the said optical phase modulation having amplitude $\Delta\phi$, f) an optical delay line (230), to delay the phase modulated pulse train with respect to the intensity modulated pulse sequence by a time $(h+1/2)T_B$, h being an integer number, g) a polarizing coupler (234) to recombine the obtained two pulsed portions making them orthogonally polarized and temporally interleaved, the said coupler (234) having at its output the said digital optical signal (240).

15. A device (210) for modulating a digital optical signal (240) according to claim 14, characterized in that the said Phase Tributary is differentially pre-encoded (228).

16. A device (210) for modulating a digital optical signal (240) according to claim 14, characterized in that the said Amplitude Tributary (218) is logically complemented.

17. A device (210) for modulating a digital optical signal (240) according to claim 14, characterized in that the said Phase Tributary (228) is logically complemented.

18. A device (210) for modulating a digital optical signal (240) according to claim 15, characterized in that the said optical phase modulator (220) modulates the optical phase with amplitude $\Delta\phi=\pi$.

19. A device (210) for modulating a digital optical signal (240) according to claim 15, characterized in that the splitting ratio $\alpha$ of the said beam splitter (212) is in the range between 1 and 1.6.

20. An apparatus to transmit at least a digital optical signal (240) with a simultaneous modulation of the amplitude and the phase, the said apparatus comprising:
  a) a laser light source (102), that furnishes a substantially continuous flow of optical radiation,
  b) a device (210) for modulating a digital optical signal (240) according to claim 15, having at its input a substantially continuous flow of optical radiation.

21. A method for transmitting a digital optical signal (160), characterized in that:
  a) both the intensity and the phase of a substantially continuous flow of optical radiation are independently modulated by a dual drive modulator (104), to produce a first encoded sequence of dark pulses (328) and a second encoded sequence of optical phase (330) in the said optical signal (160),
  b) the said encoded sequence of dark pulses (328) being representative of a first binary data electrical signal $NRZ_A$ (106),
  c) the said encoded sequence of optical phase (330) being independent from the first one and representative of a second binary data electrical signal $NRZ_\phi$ (108),
  d) the said first data electrical signal $NRZ_A$ (106) and the said second data electrical signal $NRZ_\phi$ (108) are in Non-Return-to-Zero (NRZ) format,
  e) the said dual drive modulator (104) driving voltages $V_1$ (148) and $V_2$ (150) are generated according to the following equations:

$d_A(t) = NRZ_A(t) \oplus d_A(t-T_B)$ $b_\phi(t) = NRZ_A(t) \oplus NRZ_\phi(t)$ $d_\phi(t) = b_\phi(t) \oplus d_\phi(t-T_B)$ $V_A(t) = d_A(t) \cdot V_\pi$ $V_\phi(t) = d_\phi(t) \cdot V_\pi - V_\pi/2$ $V_1(t) = V_A(t) + V_\phi(t) + V_{bias}$ $V_2(t) = -V_A(t) + V_\phi(t)$ $NRZ_A$, $NRZ_\phi$, $d_A$, $b_\phi$ and $d_\phi$ being normalized logical signals, $\oplus$ the logical Exclusive-OR operator, $V_{bias}$ (142) and $V_\pi$ the said modulator (104) bias and inversion voltages respectively and $T_B$ the tributary bit period.

22. A method for transmitting a digital optical signal (160) according to claim 21, characterized in that the said encoded phase modulation (330) is of differential phase modulation (DPSK) type.

23. A method for transmitting a digital optical signal (160) according to claim 21, characterized in that the said bias voltage $V_{bias}$ (142) for the said optical modulator (104) equals $-V_\pi$.

24. A method for transmitting a digital optical signal (240) with a simultaneous modulation of the amplitude and the phase, comprising the steps of:
  a) generating a first Return-to-Zero (RZ) optical signal, representative of a first binary data sequence (218) carrying information and having:
    a1) bit rate R and bit period $T_B=1/R$,
    a2) nearly unperturbed optical pulses corresponding to the bits of the said first data sequence (218) that are equal to a first of the two logical states,
    a3) reduced power pulses or absence of optical pulses corresponding to the bits of the said first data sequence (218) that are equal to the second of the two logical states,
  b) generating a second optical signal by a phase modulated pulse train, representative of a second binary data sequence (222) carrying further information independent from the said first data sequence and having:
    b1) bit rate R and bit period $T_B=1/R$,
    b2) delay $\tau_\phi$ respect to the said first optical signal,
    b3) optical pulses with $\phi_0$ optical phase corresponding to the bits of the said second data sequence (222) that are related to a first of the two logical states,
    b4) optical pulses with $\phi_0+\Delta\phi$ optical phase corresponding to the bits of the said second data sequence (222) that are related to the second of the two logical states,
    b5) the said optical pulses having peak power equal to $1/\alpha$ times the peak power of the said first optical signal, $\alpha$ being a positive number greater or equal to unity,
  c) polarization multiplexing the said first and second optical signals, making them orthogonally polarized and interleaved in time.

25. A method for transmitting a digital optical signal (240) according to claim 24, characterized in that the said encoded phase modulation has amplitude $\Delta\phi=\pi$ and delay $\tau_\phi=(h+1/2)T_B$, with h an integer number, and the said positive number $\alpha$ is in the range between 1 and 1.6.

* * * * *